United States Patent [19]

Frank et al.

[11] Patent Number: 5,584,518
[45] Date of Patent: Dec. 17, 1996

[54] BUMPER WITH BRACKETS FOR MOUNTING IT ONTO A VEHICLE

[75] Inventors: Simon Frank, Watterdingen; Werner Graf, Engen, both of Germany

[73] Assignee: Alusuisse Technology & Management Ltd., Switzerland

[21] Appl. No.: 560,430

[22] Filed: Nov. 17, 1995

[30] Foreign Application Priority Data

Dec. 23, 1994 [CH] Switzerland ............ 03928/94

[51] Int. Cl.⁶ .................................. B60R 19/24
[52] U.S. Cl. ............ 293/155; 293/102; 293/154
[58] Field of Search ............ 293/102, 120–122, 293/154, 155

[56] References Cited

U.S. PATENT DOCUMENTS

| | | | |
|---|---|---|---|
| 1,501,191 | 7/1924 | Sager | 293/155 X |
| 1,534,010 | 4/1925 | Feiner | D12/169 |
| 2,954,256 | 9/1960 | Barenyi | 293/155 X |
| 3,850,466 | 11/1974 | Yepis . | |
| 3,907,351 | 9/1975 | Pozelt | 293/121 X |
| 4,563,028 | 1/1986 | Ogawa et al. | 293/122 |
| 5,080,410 | 1/1992 | Stewart et al. | 293/102 |
| 5,114,198 | 5/1992 | Yamashita et al. | 293/155 |

FOREIGN PATENT DOCUMENTS 1387354  3/1975  United Kingdom ............ 293/120

OTHER PUBLICATIONS

Patent Abstracts of Japan, vol. 17, No. 709, Dec. 24, 1993 for Japanese Patent 5,246,289, dated Sep. 24, 1993.
Patent Abstracts of Japan, vol. 18, No. 576, Nov. 4, 1994, for Japanese Patent 6211090, dated Aug. 2, 1994.

*Primary Examiner*—Dennis H. Pedder
*Attorney, Agent, or Firm*—Bachman & LaPointe, P.C.

[57] ABSTRACT

A bumper with brackets attached for mounting it onto a vehicle, in particular a private car, is such that, at least in the region of the brackets, the bumper is bowed with respect to the front line of the vehicle, and features section walls a distance apart in the form of a compression wall and a tension wall and a pair of transverse walls joining them making up a hollow section. The brackets feature a wedge-shaped support, the sloping face of which lies against the tension wall and is connected to this in region at the highest point of the sloping face.

12 Claims, 4 Drawing Sheets

BUMPER WITH BRACKETS FOR MOUNTING IT ONTO A VEHICLE

BACKGROUND OF THE INVENTION

The invention relates to a bumper with brackets attached for mounting it onto a vehicle, in particular a private car, such that at least in the region of the brackets, the bumper is bowed with respect to the front line of the vehicle, and features section walls a distance apart in the form of a compression wall and a tension wall and a pair of transverse walls joining them making up a hollow section.

Apart from the cross-sectional shape of the bumper, the manner of connecting it to the longitudinal frame members of the vehicle affects shape retention characteristics and the capacity to accommodate the energy of deformation during impact.

Many kinds of bracket for attaching the bumper to the vehicle are known but, however, hardly contribute to improving the shape retention characteristics of a bumper during impact.

SUMMARY OF THE INVENTION

In view of this the object of the present invention is to provide a bumper with brackets of the kind discussed above that exhibits low weight and a high capacity for shape retention along with adequate ability to accommodate the energy of deformation on impact. Further, the production and handling of the bumper and the brackets should be very simple.

That object is achieved by way of the invention in that the brackets feature a wedge-shaped support, the sloping face of which lies against the tension wall and is connected to this in the region of the highest point of the sloping face.

The features concerning further development of the bumper according to the invention are discussed herein below.

A preferred version of the bumper according to the invention is such that the brackets feature a mounting plate that can be attached to the longitudinal frame members of vehicles and is shaped such that the wedge-shaped support is an integral part of it.

Connecting the wedge-shaped bracket to the tension wall is usefully made via bolts or rivets.

A particularly preferred version of the bumper arrangement according to the invention is such that the breadth of the tension wall projects on both sides a distance beyond the breadth of the sloping face of the wedge-shaped support.

Bumpers and brackets are preferably made from a light metal alloy especially an alloy of aluminum, the bumper being an extruded section.

The angle between the sloping face of the wedge-shaped support and the front line of the vehicle is preferably between 5° and 25°, in particular between about 5° and 15°.

For reasons of stability the vertical line of projection in region at the highest point of the sloping face on the wedge lies within a longitudinal frame member

DESCRIPTION OF THE DRAWINGS

Further advantages, features and details of the invention are revealed in the following description of a preferred exemplified embodiment of the invention and by way of the drawings which show schematically in FIG. 1 plan view of a bumper.

DETAILED DESCRIPTION OF PREFERRED EMBODIMENTS

Figure 1:
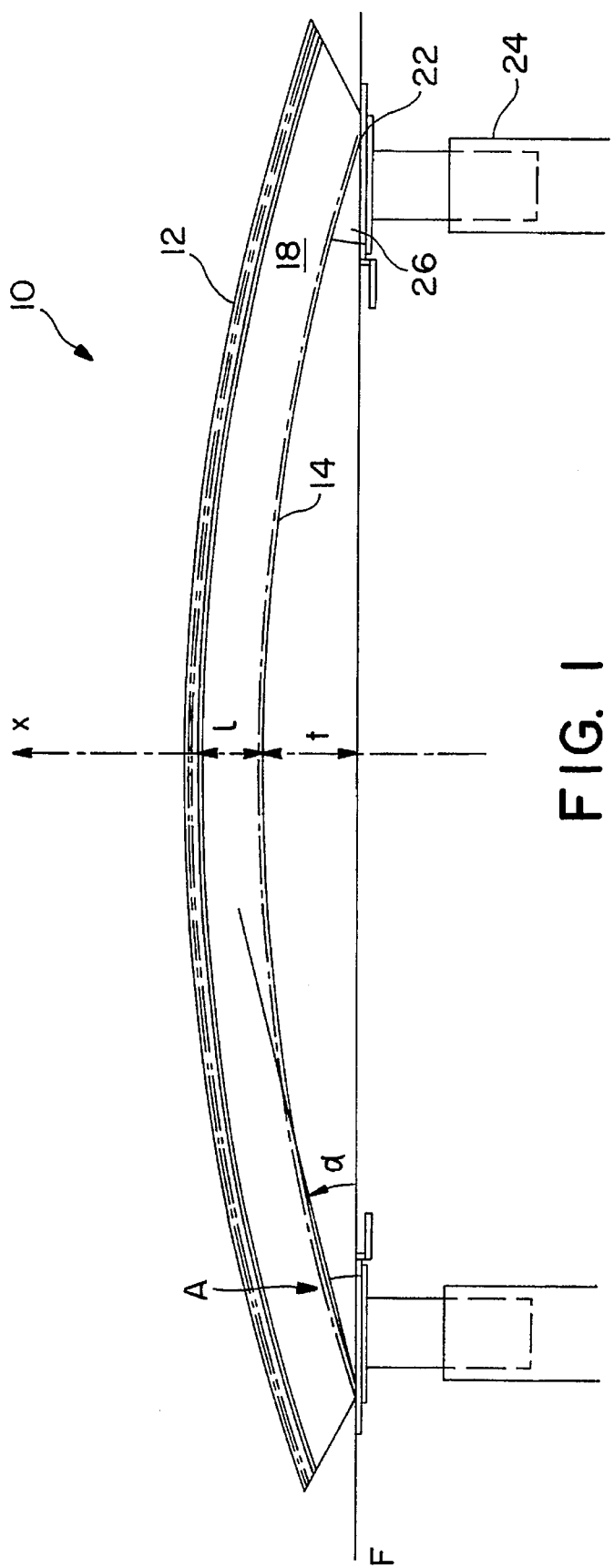

Shown in FIG. 1 is a bumper 10 of a private car which for reasons of clarity is omitted here. The bumper 10 is attached to the longitudinal frame member 24 of the vehicle via brackets 22. The bumper is an extruded aluminum section and is bowed out in the middle a distance t from an imaginary front line F of a private car.

Figure 2:
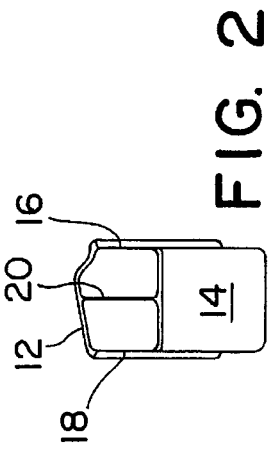
FIG. 2 cross-section through the bumper in FIG. 1 along line I—I.

As shown in FIGS. 1 and 2, the bumper 10 features two section walls 12, 14 a distance 1 apart and transverse walls 16, 18 joining them making up a hollow section. As assembled, section wall 12 facing away from the vehicle is the outer wall that takes the impact i.e. the compression wall; the section wall 14 facing the vehicle is the inner wall or tension wall. In the middle, between the two transverse walls 16, 18 is a transverse strut 20 joining the section walls 12, 14.

Figure 3:
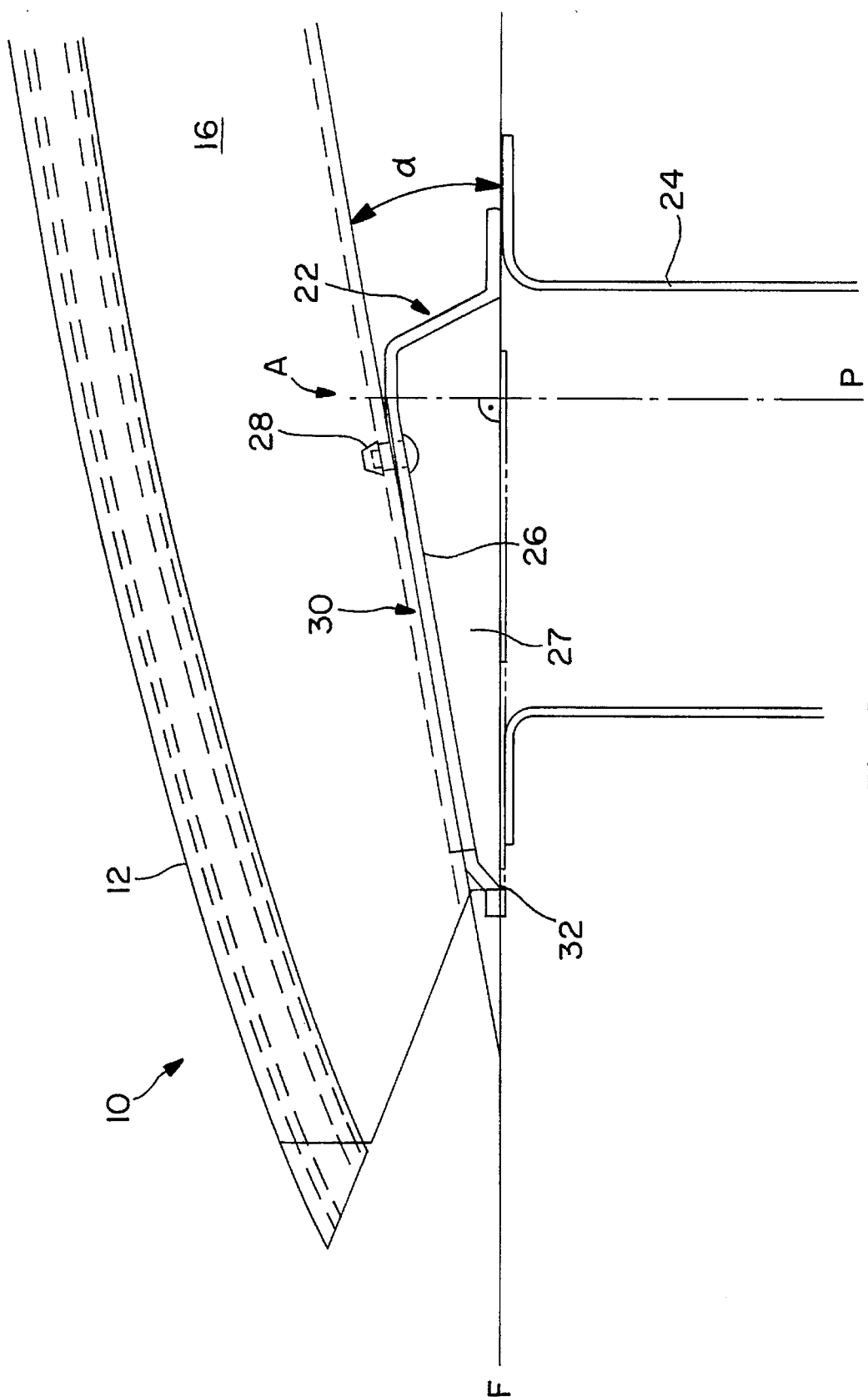
FIG. 3 enlarged detail of FIG. 1 in the region of a bracket.
Figure 4:
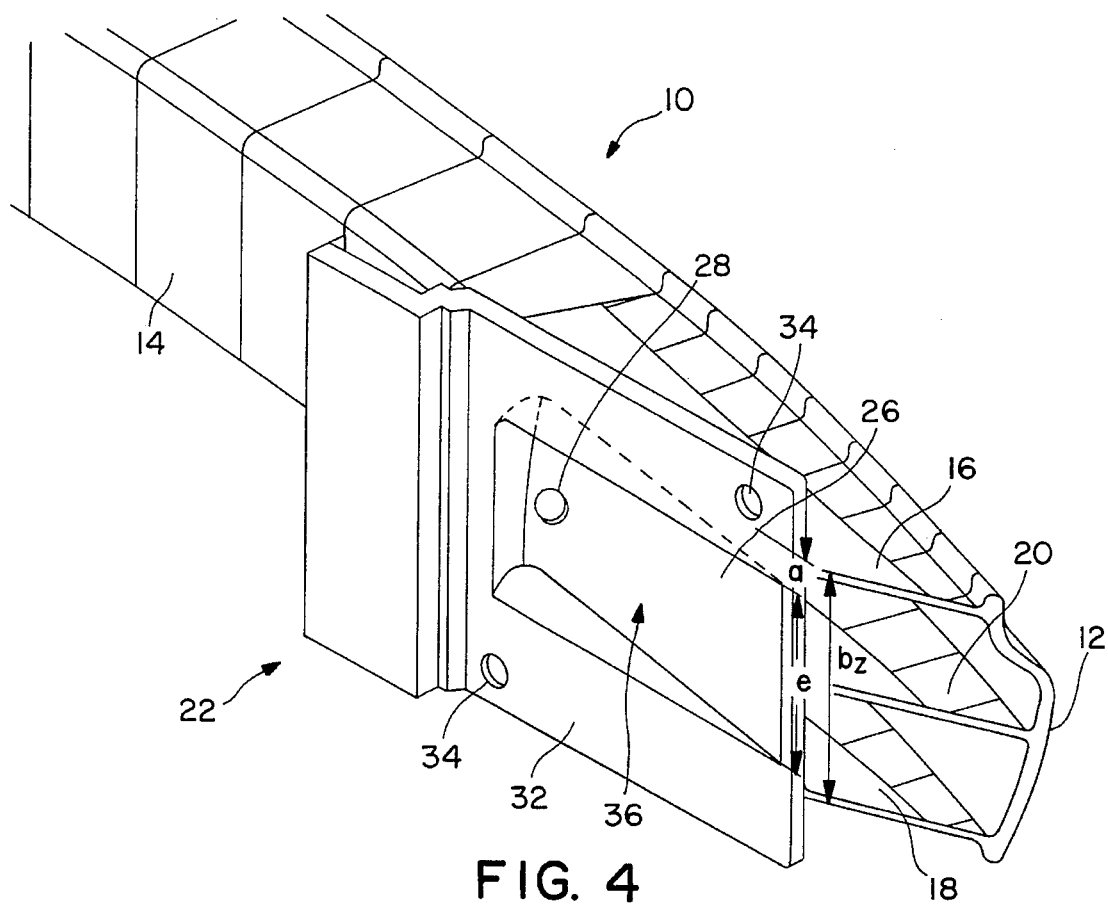
FIG. 4 perspective view of the under part of the bracket in FIG. 3.

As can be seen particularly well in FIGS. 3 and 4, the bracket 22 features a mounting plate 32 which in the assembled state is bolted to the longitudinal frame member 24 of the vehicle via diagonally bored holes 34. A wedge-shaped support 26 has been formed in the mounting plate 32 forming a hollow space 27. The sloping face 30 of this wedge-shaped support 26 lies against the tension wall 14 and is joined to the tension wall 14 via a rivet 28 in region A at the highest point of the support 26. For reasons of stability during impact, it is important that the vertical line of projection p from region A to the front line F lies within the longitudinal frame member 24 of the vehicle.

The sloping face 30 forms an angle ($\alpha$) of e.g. 10° with the imaginary front line (F) of the vehicle which runs perpendicular to the longitudinal direction x of the vehicle. The angle $\alpha$ between the sloping face 30 of the wedge-shaped support 26 and the front line F of the vehicle is 5° to 25°, in particular 5°–15°.

From FIG. 4 it can be seen that the breadth $b_z$ of the tension wall 14 projects on both sides a distance a beyond the breadth e of the wedge-shaped support 26 or of the sloping face 30. The significance of this special arrangement may be seen from the deformation of the bumper 10 in the region of the bracket 22 shown schematically in FIGS. 5a to c.

Figure 5A:
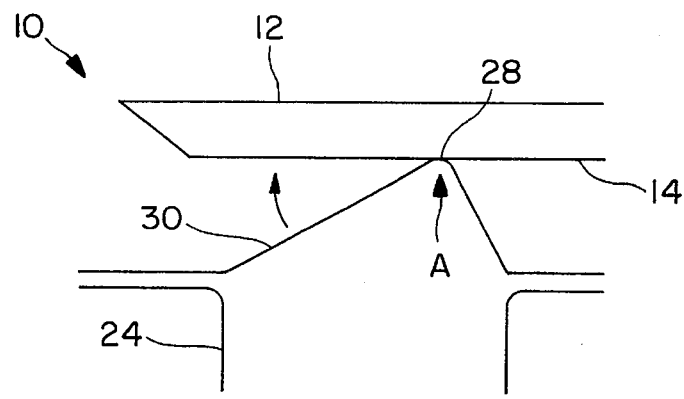
FIG. 5a–c deformation of the bumper in the region of the bracket.
Figure 5B:
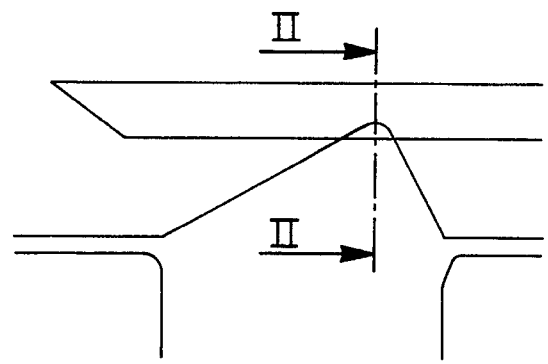
Figure 5C:
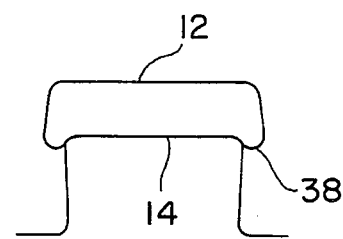

The effect of a frontal force P on the bumper 10 is such that, in a first stage, this initially straightens the curvature i.e. rotation occurs about an axis in the region A the highest point of the sloping face 30, as a result of which the tension wall is raised from the sloping face 30. Region A now provides the only contact surface for the bumper 10 (FIG. 5a). In the subsequent stage of deformation shown in FIG. 5b,c (FIG. 5c shows a section through FIG. 5b along line I—I) actual deformation of the bumper 10 occurs and with that elimination of the largest part of the energy due to impact. As can be seen especially from FIG. 5c, the result of breadth e of the wedge-shaped support 26 being smaller than breadth $b_z$ of the tension wall 14 of the bumper 10 is that the bumper 10 deforms around the support 26 like a clamp, forming bulges 38. This partial enveloping of the support 26 by the partially deforming bumper 10 results in a stability that counteracts distortion of the bumper 10, increases its capacity for shape retention and as a whole improves the capacity to accommodate the deformation energy due to impact.

Figure 6:
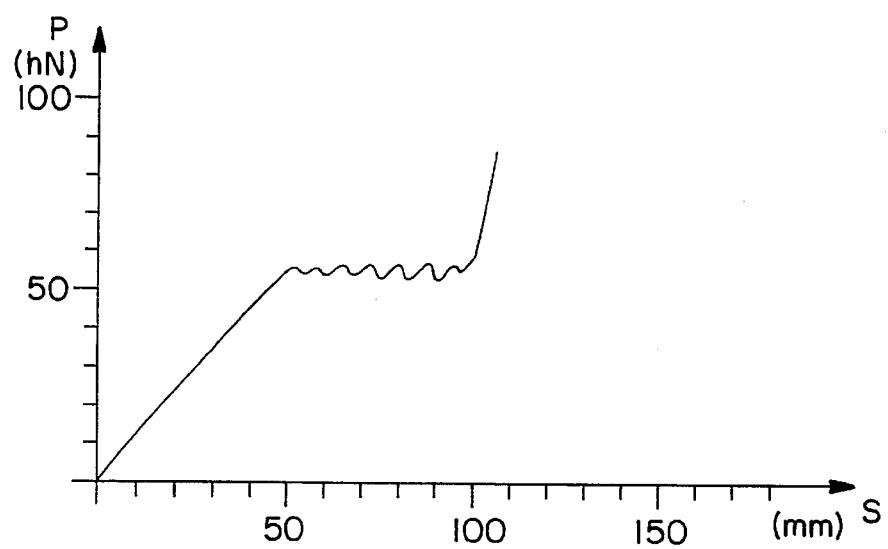
FIG. 6 a stress strain curve from loading trials.

The stress-strain diagram according to FIG. 6 shows the dependence of the compressive load P (kN) as a function of the amount of bending s (mm) as a result of a load test carried out on a bumper arrangement according to the invention. The shape of the curve points to the excellent capacity for accommodating the deformation energy on impact.

We claim:

1. Bumper with brackets attached for mounting onto a vehicle, which comprises: a bumper; brackets attached to the bumper, wherein at least in the region of the brackets, the bumper is bowed with respect to a transverse front line of the vehicle, and includes section walls a distance apart in the form of a compression wall and a tension wall and a pair of transverse walls joining said compression and tension walls making up a hollow section; wherein the brackets include a wedge-shaped projection with a sloping face having a highest point, wherein the sloping face lies against the tension wall and is connected to the tension wall in a region at substantially the highest point of the sloping face of the projection.

2. Bumper according to claim 1, wherein the brackets include a mounting plate affixed to the longitudinal frame members of the vehicle, and is shaped such that the wedge-shaped projection is formed in the mounting plate.

3. Bumper according to claim 1, wherein the wedge-shaped projection is bolted or riveted onto the tension wall.

4. Bumper according to claim 1, wherein the tension wall has a breadth and the sloping face of the wedge-shaped projection has a breadth and sides, and the breadth of the tension wall projects a distance beyond the breadth of the sloping face of the wedge-shaped projection on both sides thereof.

5. Bumper according to claim 1, wherein the bumper is made from an extruded section of a light metal alloy.

6. Bumper according to claim 5, wherein said bumper is made of an aluminum alloy.

7. Bumper according to claim 1, wherein the brackets are made of a light metal alloy.

8. Bumper according to claim 7, wherein said brackets are made of an alloy of aluminum.

9. Bumper according to claim 1, wherein an angle is formed between the sloping face of the wedge-shaped projection and the transverse front line of the vehicle, and wherein the angle between the sloping face of the wedge-shaped projection and the transverse front line of the vehicle is 5° to 25°.

10. Bumper according to claim 9, wherein said angle is 5° to 15°.

11. Bumper according to claim 2, wherein a vertical line of projection from the highest point of the sloping face to the longitudinal frame members normal to said transverse front line lies within said longitudinal frame members.

12. Bumper according to claim 1, wherein the bracket includes peripheral regions and a central region, and wherein said sloping face extends along the central region of said brackets.

* * * * *